(12) United States Patent
Bulan et al.

(10) Patent No.: US 8,492,303 B2
(45) Date of Patent: Jul. 23, 2013

(54) ELECTRODE AND ELECTRODE COATING

(75) Inventors: Andreas Bulan, Langenfeld (DE); Norbert Schmitz, Engelskirchen (DE)

(73) Assignee: Bayer MaterialScience AG, Leverkusen (DE)

( * ) Notice: Subject to any disclaimer, the term of this patent is extended or adjusted under 35 U.S.C. 154(b) by 9 days.

(21) Appl. No.: 12/847,375

(22) Filed: Jul. 30, 2010

(65) Prior Publication Data

US 2011/0024289 A1 Feb. 3, 2011

(30) Foreign Application Priority Data

Jul. 31, 2009 (DE) .................. 10 2009 035 546

(51) Int. Cl.
 *H01M 4/88* (2006.01)
 *H01M 4/90* (2006.01)
 *H01M 4/92* (2006.01)
 *H01M 4/96* (2006.01)

(52) U.S. Cl.
 USPC ........... 502/101; 501/182; 501/185; 501/325; 501/309; 501/311; 502/313; 204/294; 204/293; 204/292

(58) Field of Classification Search
 USPC .............. 502/101, 182, 185, 325, 309, 311, 502/313; 204/294, 293, 292
 See application file for complete search history.

(56) References Cited

U.S. PATENT DOCUMENTS

| | | | | |
|---|---|---|---|---|
| 4,210,501 A | * | 7/1980 | Dempsey et al. | 205/620 |
| 6,547,947 B1 | * | 4/2003 | Uno et al. | 205/466 |
| 7,273,536 B2 | | 9/2007 | Shibata et al. | |
| 2006/0147788 A1 | * | 7/2006 | Lee et al. | 429/40 |

FOREIGN PATENT DOCUMENTS

| | | |
|---|---|---|
| DE | 602005002661 T2 | 1/2008 |
| WO | WO-2006/002843 A1 | 1/2006 |

* cited by examiner

*Primary Examiner* — Bruce Bell
(74) *Attorney, Agent, or Firm* — Novak Druce Connolly Bove + Quigg LLP

(57) ABSTRACT

The invention describes an electrode and an electrode coating which are based on a catalyst containing finely divided carbon modifications and noble metal (oxide)s.

4 Claims, No Drawings

ELECTRODE AND ELECTRODE COATING

RELATED APPLICATIONS

This application claims benefit to German Patent Application No. 10 2009 035 546.4, filed Jul. 31, 2009, which is incorporated herein by reference in its entirety for all useful purposes.

BACKGROUND OF THE INVENTION

The invention proceeds from electrodes coated with catalysts and electrode coatings for electrolysis processes for the preparation of chlorine.

The invention relates to novel catalysts, electrode coatings and electrodes for the preparation of chlorine.

Chlorine is usually prepared industrially by electrolysis of sodium chloride or hydrochloric acid or by gas-phase oxidation of hydrogen chloride (Schmittinger, Chorine, Wiley-VCH 1999, pages 19-27). If electrolysis processes are used, the chlorine is produced at the anode. Titanium on the surface of which an electrochemically active catalyst is present is usually used as electrode material for the anode. The catalyst-containing layer on the surface is usually referred to as a coating. The function of the catalyst is to reduce overvoltages and to avoid evolution of oxygen at the anode (Winnacker-Küchler, Chemische Technik, Prozesse und Produkte, 5th edition, Wiley-VCH 2005, pages 469-470).

Graphite anodes are used in the preparation of chlorine by electrolysis of hydrochloric acid (Winnacker-Küchler, Chemische Technik, Prozesse und Produkte, 5th edition, Wiley-VCH 2005, page 514). In the electrolysis of hydrochloric acid in which, for example, a gas diffusion electrode is used on the cathode side, it is possible to use titanium anodes which have noble metal-based catalysts in the coating (Winnacker-Küchler, Chemische Technik, Prozesse und Produkte, 5th edition, Wiley-VCH 2005, page 515).

Electrodes for electrolysis processes are usually based on a metal which belongs to the valve metals. Valve metals are, for example, the metals titanium, zirconium, tungsten, tantalum and niobium which owing to oxide layers on the metal surface act as diode material for electric current.

An electrocatalytically active catalyst comprising a noble metal and/or a metal oxide thereof is usually applied to the surface of the valve metals, with oxides of the valve metal also being able, if appropriate, to be additionally present in the metal oxide (WO 200602843 (ELTECH), BECK, Electrochimica Acta, Vol. 34, No. 6, pages 811-822, 1989)). The oxide-forming noble metal usually belongs to the platinum metals such as iridium, ruthenium, rhodium, palladium, platinum or mixtures thereof. Such electrodes are usually referred to as DSA electrodes (DSA="dimensionally stable anode").

Disadvantages of these known electrodes when used in halide-containing electrolytes are the still high overvoltage for chlorine formation, the tendency of the electrodes to nevertheless evolve oxygen, the high electrolysis potential and the need for large amounts of costly noble metal for producing the coating. All these factors have an adverse effect on the economics of the known electrolysis process.

For the coatings of the prior art (DE 602005002661 T2), it is known that the noble metals are eluted from the coating over time under electrolysis conditions, i.e. they are not sufficiently corrosion resistant. The necessity of corrosion resistance is made clear by the fact that the loss of the noble metal-containing coating leads to the electrode metal, usually the valve metal, coming into direct contact with the electrolyte and forming an oxide which does not conduct current on its surface. In an ongoing electrolysis process, this means that electrochemical processes no longer take place on this surface, which can result in total failure with the corresponding economic consequences.

Furthermore, when the electrolyser having noble metal-containing DSA electrodes is used in chloride-containing solutions for the preparation of chlorine, it is observed that the secondary reaction of oxygen formation cannot be fully suppressed, as a result of which oxygen is present in the chlorine. The proportion of oxygen means an increased outlay for purification of the chlorine and therefore likewise has adverse effects on the economics of the electrolysis. The increased formation of oxygen is particularly clearly apparent when the sodium chloride concentration in the electrolyte decreases, in particular at a concentration below 200 g/l of NaCl.

Furthermore, the sole use of noble metals as catalytic material likewise has an adverse effect on the economics of known electrodes because of the high price and decreasing availability on the world market of these metals.

Attempts have been made to use diamond coatings for electrodes in electrochemical processes, e.g. such coatings can be applied to electrodes by CVD processes (chemical vapour deposition). In the case of electrolysis in sodium sulphate anolytes acidified with sulphuric acid, the coating is not stable and flakes off. Furthermore, the coating had defects so that the electrode metal was exposed to electrochemical corrosive attack. (AiF research project 85 ZN, 2003 to 2005, final report for the period 1.01.2003 to 31.03.2005 "Entwicklung and Qualitätssicherung stabiler Diamant-beschichteter Elektroden für neuartige elektrochemische Prozesse"). The research project was stopped because the technical objective was not achieved. (http://www.ist.fraunhofer.de/kompetenz/funktion/diaelektro/Abschlussbericht%20KombiAB2-eingereicht.pdf). We have carried out our own unpublished experiments on the use of electrode coatings containing only diamond in electrolysis. No chlorine has hitherto been able to be evolved from a sodium chloride solution at these diamond structures. Furthermore, it was observed that the diamond layer becomes detached from the metal support under electrolysis conditions.

It was therefore an object of the invention to find a catalyst which enables the electrolysis to be carried out at a lower electrolysis voltage and a lower sodium chloride concentration, with the oxygen content in the chlorine being minimized and the use of noble metal being reduced. A further object was to find a coating which adheres firmly to the metal of the electrode and is not attacked either chemically or electrochemically. A chemically resistant, inexpensive catalyst which has a low noble metal content should likewise be made available for the gas-phase oxidation of hydrogen chloride.

EMBODIMENTS OF THE INVENTION

An embodiment of the present invention is a catalyst for preparing chlorine by means of electrolysis of electrolytes comprising chlorine ions, wherein said catalyst comprises at least one noble metal of transition group VIIIa (Fe, Ru, Rh, Pd, Os, Ir, Pt) of the Periodic Table of the Elements and/or an oxide of these noble metals, wherein said catalyst additionally comprises at least one finely divided carbon modification selected from the group consisting of diamond, doped diamond, fullerene, carbon nanotubes, vitreous carbon, and graphite, and wherein said catalyst optionally comprises at least one valve metal and/or valve metal oxide.

Another embodiment of the present invention is the above catalyst, wherein said catalyst comprises from 10 to 90 mol % of said at least one finely divided carbon modification and from 0.05 to 40 mol % of said at least one noble metal and/or noble metal oxide.

Another embodiment of the present invention is the above catalyst, wherein said catalyst comprises from 20 to 80 mol % of said at least one finely divided carbon modification and from 1 to 20 mol % of said at least one noble metal and/or noble metal oxide.

Another embodiment of the present invention is the above catalyst, wherein said catalyst comprises from 0.05 to 40 mol % of said at least one noble metal and/or noble metal oxide, from 9.95 to 60 mol % of said at least one valve metal and/or valve metal oxide, and from 20 to 90 mol % of said at least one finely divided carbon modification.

Another embodiment of the present invention is the above catalyst, wherein said at least one finely divided carbon modification is diamond and/or boron-doped diamond.

Another embodiment of the present invention is the above catalyst, wherein said at least one noble metal and/or noble metal oxide is selected from the group consisting of iridium, ruthenium, rhodium, palladium, platinum, and oxides thereof.

Another embodiment of the present invention is the above catalyst, wherein said at least one valve metal and/or valve metal oxide is selected from the group consisting of titanium, zirconium, tungsten, tantalum, niobium, and oxides thereof.

Another embodiment of the present invention is the above catalyst, wherein said at least one valve metal and/or valve metal oxide is tantalum and/or tantalum oxide.

Yet another embodiment of the present invention is an electrode for producing chlorine by electrolysis of electrolytes containing chlorine ions, wherein said electrode comprises at least one electrically conductive support and a catalytically active coating, wherein said catalytically active coating comprises the above catalyst.

Another embodiment of the present invention is the above electrode, wherein said at least one electrically conductive support comprises a valve metal selected from the group consisting of titanium, zirconium, tungsten, tantalum, and niobium.

Another embodiment of the present invention is the above electrode, wherein said at least one electrically conductive support comprises titanium.

Another embodiment of the present invention is the above electrode, wherein the noble metal loading of the electrode surface is from 0.1 to 20 g of noble metal/m$^2$ and/or the loading of the electrode surface with finely divided carbon is from 0.1 to 50 g of carbon/m$^2$.

Yet another embodiment of the present invention is a process for producing electrodes for preparing chlorine, wherein said process comprises applying a layer of (1) at least one carbon-containing compound selected from the group consisting of diamond, doped diamond, fullerenes, and carbon nanotubes, (2) optionally, at least one valve metal, valve metal oxide, or mixture thereof, and (3) a noble metal of the Periodic Table of the Elements and/or an oxide of these noble metals to a base material comprising a valve metal selected from the group consisting of titanium, zirconium, tungsten, tantalum and niobium, wherein said application is achieved by applying a mixture of (1) a powder of a carbon modification, a solvent, a soluble noble metal compound, and optionally a valve metal compound soluble in said solvent to said base material and drying and/or sintering said mixture to remove said solvent.

Another embodiment of the present invention is the above process, wherein said application, drying, and/or sintering is repeated up to 20 times.

Another embodiment of the present invention is the above process, wherein said application, drying, and/or sintering is repeated up to 10 times.

Another embodiment of the present invention is the above process, wherein said suspension has a solids content of up to 20% by weight.

Another embodiment of the present invention is the above process, wherein said suspension has a solids content of up to 10% by weight.

Yet another embodiment of the present invention is an electrode produced by the above process.

DESCRIPTION OF THE INVENTION

It has surprisingly been found that catalysts containing finely divided carbon modifications can be used on electrodes for preparing chlorine, where the carbon-containing component of the catalyst comprises one or more carbon modifications and also a noble metal of the platinum metals and/or an oxide thereof or mixtures thereof. Furthermore, the catalyst can contain a valve metal and/or an oxide thereof or a mixture thereof.

The invention provides a catalyst for preparing chlorine by means of electrolysis of electrolytes comprising chlorine ions, based on at least one noble metal of transition group VIIIa (Fe, Ru, Rh, Pd, Os, Ir, Pt) of the Periodic Table of the Elements and/or an oxide of these noble metals, characterized in that the catalyst additionally contains at least one finely divided carbon modification from the group consisting of diamond, doped diamond, fullerene, carbon nanotubes, vitreous carbon (Philosophical Magazine, 11 October 2004, Vol. 84, No. 29, 3159-3167, Fullerene-related structure of commercial glassy carbons, P. J. F. Harris) and graphite and, if appropriate, additionally at least one valve metal or a valve metal oxide or mixtures thereof.

The incorporation of carbon-comprising components into the catalyst or into the surface structure of the electrode enables the noble metal content of the electrode coating to be reduced extremely without the electrolysis potential and the oxygen content in the chloride being increased. A further advantage of the use of the catalyst in the electrolysis of sodium chloride is that the sodium chloride concentration in the anolyte can be reduced from 220 g/l-300 g/l to less than 150 g/l of NaCl without the oxygen content in the chlorine rising or the electrolysis potential being increased.

In the following, finely divided carbon modifications are the forms diamond, fullerenes, carbon nanotubes, nitrogen-modified carbon nanotubes (SEN; "Nitrogen-containing carbon nanotubes"; J. Mater. Chem., 1997, 7(12), 2335-2337) and other carbon modifications, e.g. vitreous carbon (Sigradur®) and graphites. For the purposes of the invention, finely divided means, in particular, that the particle diameter of the carbon particles does not exceed 10 μm.

Diamond together with graphite and the fullerenes are the three modifications of carbon. Since 1955, the high-pressure high-temperature process has made it possible to produce synthetic diamonds. In this process, graphite is pressed together in a hydraulic press at a pressure of up to 6 gigapascal (60 000 bar) and a temperature of over 1500° C. Under these conditions, diamond is the thermodynamically more stable form of carbon, so that the graphite is transformed into diamond. This transformation process can be accelerated by addition of a catalyst. In a manner analogous to diamond, cubic boron nitrite (CBN) can likewise be produced from the hexagonal modification of boron nitride by use of the high-pressure high-temperature synthesis. CBN does not quite achieve the hardness of diamond but is, for example, resistant to oxygen at high temperatures.

In parallel thereto, the shock wave diamond synthesis using extremely high pressures as occur in explosions has been developed. This commercially successful route gives diamond powder in various finenesses.

An alternative possibility for producing synthetic diamond is the coating of substrates by means of chemical vapour deposition (CVD). Here, a diamond layer having a thickness of a few microns is deposited on the substrates, for example cemented carbide surfaces, in a vacuum chamber. The starting material is a gas mixture of methane and hydrogen, with the former serving as carbon source. According to Ostwald's step rule, mainly metastable diamond should be deposited; according to the Ostwald-Volmer rule, graphite is predominantly formed because of its lower density. Atomic hydrogen makes it possible to decompose graphite selectively and promote the formation of diamond. Atomic hydrogen is formed from molecular hydrogen gas in a thermally or electrically heated plasma. The substrate temperature has to be below 1000° C. to prevent transformation into the stable graphite. Growth rates of a number of microns per hour can then be achieved. As a further development, layers of diamond-like carbon (DLC) having a thickness of only a few microns can be produced by means of the plasma coating technique. These layers combine the extreme hardness of diamond with the very good sliding friction properties of graphite.

Diamond structures can be applied to surfaces by microwave plasma CVD, e.g. in the process developed by DIACCON. Here, free radicals are formed in a gas mixture of hydrogen, methane and oxygen in a plasma having a temperature of 2000° C.-6000° C. and lead to growth of crystalline diamond on a substrate at a temperature of 600° C.-950° C. The growth rates in this deposition technique are 0.5-10 microns per hour. A further process employed by DIACCON is the hot filament CVD process. Here, the free radicals are produced from a tungsten, tantalum or rhenium wire at a temperature of 1800° C.-2500° C. in a gas mixture of hydrogen and methane and are deposited as crystalline diamond on the substrate having a temperature of about 600° C.-950° C. Various diamond morphologies and growth rates can be achieved by targeted influencing of the growth parameters. Average growth rates are in the range from 0.1 to 1 microns per hour.

For the purposes of the invention, valve metals are, in particular, the metals of the group: titanium, zirconium, tungsten, tantalum and niobium.

The invention also provides an electrode for preparing chlorine by means of electrolysis of electrolytes containing chlorine ions, which comprises at least an electrically conductive support and a catalytically active coating, characterized in that the catalytically active coating contains a catalyst according to the invention as described above.

Preference is given to an electrode which is characterized in that the electrically conductive support is formed by a valve metal from the group: titanium, zirconium, tungsten, tantalum and niobium, preferably titanium.

In the process of the invention, titanium is particularly preferably used as material for the support and, if appropriate, as additive to the coating.

In the process of the invention, it is also possible to use doped diamonds, for example boron-doped diamonds, and also fullerenes filled with diamonds, doped diamonds or noble metals, e.g. of the platinum metals.

Electrodes having electrode coatings containing the catalyst comprising finely divided carbon modifications can also be used, in addition to the above-described uses in the preparation of chlorine, in the electrolysis of water, the regeneration of chromium baths and in the preparation of hydrogen peroxide, ozone or peroxodisulphate when fluoride-containing electrolytes are used.

The additional doping of the catalysts of the invention with further metals such as nickel, cobalt, tin or lanthanum or oxides thereof is likewise a further variant. Here, the molar ratio of dopant metal to noble metal in the catalytically active layer is from 0.0001 to 0.1.

Preference is given to a catalyst which is characterized in that the catalyst comprises from 10 to 90 mol %, preferably from 20 to 80 mol %, of finely divided carbon modification and from 0.05 to 40 mol %, preferably from 1 to 20 mol %, of noble metal and/or noble metal oxide.

Particular preference is given to a catalyst which is characterized in that the catalyst comprises 0.05-40 mol % of noble metal and/or noble metal oxide, 9.95-60 mol % of valve metal and/or valve metal oxide and from 20 to 90 mol % of the carbon modification. The noble metal loading is from 0.1 to 20 g of noble metal/$m^2$ or from 0.1 to 50 g of carbon/$m^2$. The area is the projected electrode surface. Electrodes for the preparation of chlorine usually comprise expanded metal or louvre structures. The amount of noble metal or carbon is then based on a surface area which can be calculated from the external dimensions. The amount of noble metal or carbon applied per $m^2$ can be set via the concentration of the solution applied or via the number of repetition cycles. The individual cycles can in each case be interrupted by drying and/or sintering cycles. Drying or sintering can be carried out under reduced pressure and/or in other gas atmospheres.

The catalysts for producing the coating on the support, e.g. a valve metal-based substrate, can be applied by various methods.

The invention also provides a process for producing electrodes for preparing chlorine, characterized in that a layer of at least one carbon-containing compound from the group consisting of diamond, doped diamond, for example boron-doped diamond, fullerenes and carbon nanotubes and, if appropriate, additionally at least one valve metal or a valve metal oxide or mixtures thereof and a noble metal of the Periodic Table of the Elements and/or an oxide of these noble metals is applied to a base material comprising a valve metal of the group consisting of titanium, zirconium, tungsten, tantalum or niobium by applying a mixture of a powder of the compound containing the carbon modification, a solvent, if appropriate a valve metal compound which is soluble in the solvent and a preferably soluble noble metal compound to the base material and drying and/or sintering the mixture to remove solvent.

A particular embodiment of the novel process comprises applying the catalysts as follows to an electrode structure comprising a valve metal: for this purpose, the electrode structure is sand blasted and subsequently pickled by means of an acid such as hydrochloric acid or oxalic acid to remove oxides on the surface.

To coat the surface, it is possible to use, for example, a suspension which comprises a noble metal compound, at least one solvent from the group: $C_1$-$C_6$-alcohol, water, a mineral acid, a valve metal compound and the carbon modification.

If necessary, further other metals or metal compounds can be added to this suspension.

The suspension preferably comprises up to 20% by weight, particularly preferably up to 10% by weight, of solid, based on the weight of the suspension. However, it is also possible to produce suspensions having a lower solids content when the coating process is to be carried out with an increased number of cycles. An increased number of cycles is particularly advantageous when a more uniform distribution of noble metal is to be achieved at a very low noble metal content.

As noble metal compound, it is possible to use, for example, a noble metal chloride.

As alcohol, it is possible to use short-chain precursor compounds, i.e. $C_1$-$C_6$-alcohols such as n-butanol. As acid, it is possible to use, for example, concentrated hydrochloric acid. As valve metal compound, use is made of, e.g. in the case of titanium as electrode support, tetrabutyl titanate. The finely divided carbon modification can be added to this solution or suspension.

Varying the composition of the suspension enables the viscosity to be matched to the respective application process.

The suspension produced is then preferably applied in a number of cycles to the surface of the electrode substrate. This can be effected by brushing, spraying or dipping. Other methods of application are likewise conceivable. After an application cycle, the liquid components of the suspension can be removed by drying. It is now possible to commence a fresh cycle or to subject the electrode after drying to sintering at a temperature above 60° C. After this, the suspension can be applied afresh. Drying and sintering operations can be carried out alternately or in any order in succession.

The drying of the coating can be carried out at atmospheric pressure or under reduced pressure, if appropriate under a protective gas. This likewise applies to sintering of the coating.

It is likewise conceivable to alter the formulation of the suspension in the application and drying cycles and thereby produce gradients in the structure of the coating. Thus, for example, the electrode metal can firstly be coated with a low noble metal content and the noble metal content can be increased in further coating cycles.

It is likewise conceivable to mix various carbon modifications into the suspension.

The invention also provides an electrode for preparing chlorine by means of electrolysis of electrolytes containing chlorine ions, which comprise at least an electrically conductive support and a catalytically active coating, characterized in that the catalytically active coating contains a catalyst according to the invention as described above.

Preference is given to an electrode which is characterized in that the electrically conductive support is formed by a valve metal from the group: titanium, zirconium, tungsten, tantalum and niobium, preferably titanium.

The invention further provides an electrode obtained by the novel coating process. The invention further provides for the use of the novel electrode for the anodic electrolysis of electrolytes containing chlorine ions, in particular aqueous HCl or NaCl solutions, for the preparation of chlorine.

The coated electrodes which are being produced in this way can be used as anode, especially in the electrolysis of sodium chloride and the electrolysis of hydrochloric acid.

The invention is illustrated by way of example below.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Example 1

Comparative Example Using Commercial Anodes for the Electrolysis of NaCl

A standard anode for the electrolysis of NaCl from Denora, which was provided with a ruthenium-containing coating, was used. The size of the anode in the laboratory cell used was 10*10 cm, the anode support material comprised titanium and had the form of expanded metal, characterized by a mesh opening of 8 mm, a strut width of 2 mm and a strut thickness of 2 mm. An ion-exchange membrane from Dupont, type Nafion 982, was used between anode space and cathode space. A standard cathode for the electrolysis of NaCl from Denora served as cathode. An NaCl-containing solution having a sodium chloride concentration of 210 g/l and a temperature of 88° C. was introduced into the anode space of the electrolysis cell. A sodium hydroxide solution having an NaOH concentration of 31.5% by weight and a temperature of 88° C. was introduced on the cathode side of the cell. The current density was 4 kA/$m^2$, calculated for the membrane area of 10*10 cm. The chlorine concentration of the gas leaving the anode chamber was 97% by volume. The electrolysis potential was 3.05 V.

Example 2

Comparative Example

A coating solution comprising 2.02 g of $RuCl_3*3H_2O$, 1.5 g of $IrCl_3*3H_2O$, 17.4 ml of n-butanol, 1.1 ml of concentrated hydrochloric acid, 6 ml of tetrabutyl titanate is made up. This is applied by means of a brush to titanium expanded metal which has been sand blasted and subsequently pickled in 10% strength oxalic acid at 90° C. for 30 minutes as support. The expanded metal is subsequently dried at 80° C. for 10 minutes and subsequently sintered at 470° C. for 10 minutes. The application process is repeated four times, as is drying and sintering. The final sintering is carried out at 470° C. for 60 minutes. The noble metal loading was 10.5 g of Ru/$m^2$ and 10.6 g of Ir/$m^2$. The surface produced had a composition of 27.1 mol % of Ru, 14.4 mol % of Ir and 58.6 mol % of Ti. The anode which had been treated in this way was used in the electrolysis of sodium chloride in a cell as described in Example 1 having a standard commercial cathode. The chlorine concentration of the gas leaving the anode chamber was 98.3% by volume. The electrolysis potential was 3.06 V.

Example 3

Process According to the Invention—Diamond

A coating solution comprising 0.32 g of ruthenium chloride hydrate having a ruthenium content of 40.5% by weight, 12.4 ml of n-butanol, 0.8 ml of concentrated hydrochloric acid, 6 ml of tetrabutyl titanate and 0.62 g of diamond dust having a particle size of not more than 1 µm is made up. This is applied by means of a brush to titanium expanded metal which has been sand blasted and is subsequently pickled in 10% strength oxalic acid at 90° C. for 30 minutes. The expanded metal is subsequently dried at 80° C. for 10 minutes and subsequently sintered at 470° C. for 10 minutes. The application process is repeated four times, as is drying and sintering. The final sintering is carried out at 470° C. for 60 minutes. The anode which had been treated in this way was used in the electrolysis of sodium chloride as described in Example 1. The loading of the electrode was 3.47 g of Ru/m² and 16.5 g of diamond/m². The composition of the surface was: 1.8 mol % of Ru, 24.8 mol % of Ti and 73.3 mol % of carbon in the form of diamond. The anode which had been treated in this way was used in the electrolysis of sodium chloride as described in Example 1 using a standard commercial cathode. The chlorine concentration of the gas leaving the anode chamber was 98.5% by volume. The electrolysis potential was 2.96 V.

Example 4

Process of the Invention—Fullerene

A coating solution comprising 0.32 g of ruthenium chloride hydrate having a ruthenium content of 40.5% by volume, 12.4 ml of n-butanol, 0.8 ml of concentrated hydrochloric acid, 6 ml of tetrabutyl titanate and 0.63 g of fullerene (Fullaron® M3D from Nanocompound) is made up. This is applied by means of a brush to titanium expanded metal which has been sand blasted and subsequently pickled in 10% strength oxalic acid at 90° C. for 30 minutes. The expanded metal is subsequently dried at 80° C. for 10 minutes and subsequently sintered at 470° C. for 10 minutes. The application process is repeated four times, as is drying and sintering. The final sintering is carried out at 470° C. for 60 minutes. The anode which had been treated in this way was used in the electrolysis of sodium chloride as described in Example 1. The noble metal loading was 3.47 g of Ru/m² and 16.5 g of fullerene/m². The composition of the surface was: 1.8 mol % of Ru, 24.8 mol % of Ti and 73.3 mol % of carbon in the form of fullerene. The anode which had been treated in this way was used in the electrolysis of sodium chloride as described in Example 1 using a standard commercial cathode. The chlorine concentration of the gas leaving the anode chamber was 98.4% by volume. The electrolysis potential was 3.08 V.

Example 5

Process of the Invention—Diamond-Containing Coating, Low Salt Concentration in the Anolyte A coating as described in Example 3 was used. The operating conditions were the same as in Example 1 except for the NaCl concentration in the anolyte. The NaCl concentration was only 100 g/l, The cell potential was 3.06 V and the current yield was 94.5%. Despite the low NaCl concentration, the cell could be operated. The cell potential is higher when using commercial electrodes in a comparable NaCl concentration.

The invention claimed is:

1. A process for producing electrodes for preparing chlorine, wherein said process comprises applying a layer of (1) at least one carbon-containing compound selected from the group consisting of diamond, doped diamond, fullerenes, and carbon nanotubes, (2) optionally, at least one valve metal, valve metal oxide, or mixture thereof, and (3) a noble metal of the Periodic Table of the Elements and/or an oxide of these noble metals to a base material comprising a valve metal selected from the group consisting of titanium, zirconium, tungsten, tantalum and niobium, wherein said application is achieved by applying a mixture of (1) a powder of a carbon modification, a solvent, a soluble noble metal compound, and optionally a valve metal compound soluble in said solvent to said base material and drying and/or sintering said mixture to remove said solvent, and wherein said application, drying, and/or sintering is repeated up to 20 times.

2. The process of claim 1, wherein said application, drying, and/or sintering is repeated up to 10 times.

3. The process of claim 1, wherein said suspension has a solids content of up to 20% by weight.

4. The process of claim 3, wherein said suspension has a solids content of up to 10% by weight.

* * * * *